J. W. MILNOR.
METHOD OF AND MEANS FOR COMPENSATING FOR DISTURBANCES OF EARTH POTENTIAL.
APPLICATION FILED MAR. 10, 1917.
1,254,828.
Patented Jan. 29, 1918.
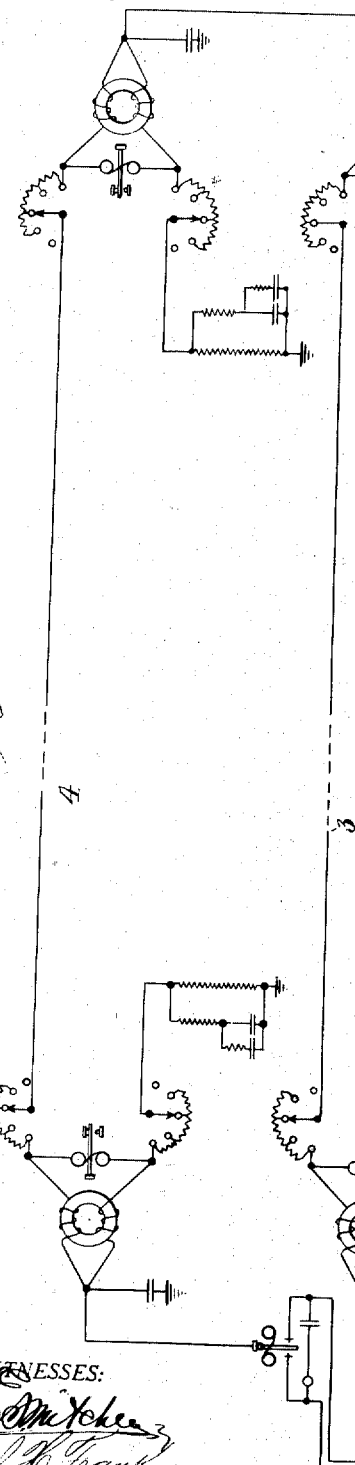
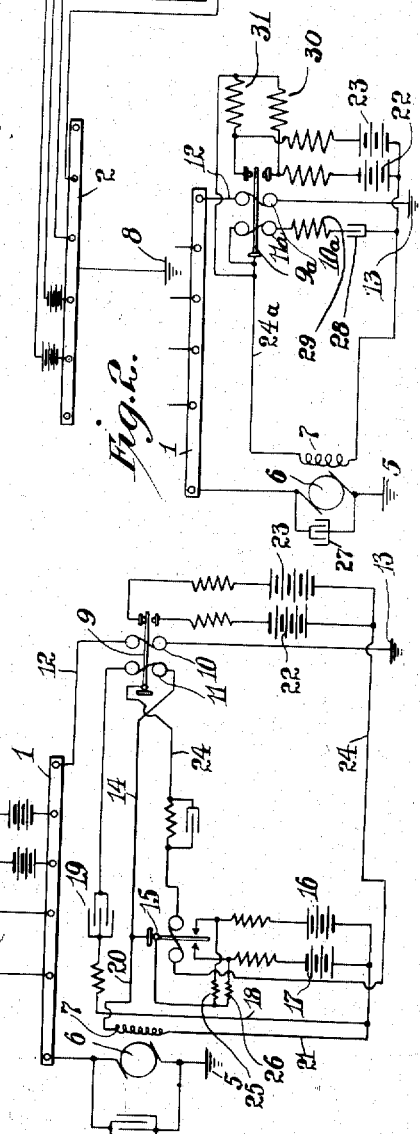

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

METHOD OF AND MEANS FOR COMPENSATING FOR DISTURBANCES OF EARTH POTENTIAL.

1,254,828.  Specification of Letters Patent.  Patented Jan. 29, 1918.

Application filed March 10, 1917. Serial No. 153,822.

*To all whom it may concern:*

Be it known that I, JOSEPH W. MILNOR, a citizen of the United States of America, and a resident of New York, county of New York, and State of New York, have invented certain new and useful Methods of and Means for Compensating for Disturbances of Earth Potential, of which the following is a specification.

My invention relates to a method of and means for compensating for differences of potential between the ground connections at the two ends of a system of electrical communication, such, for example, as a telegraph system; and as an apparatus comprises a generator located in one of the ground connections of the system, together with means for reversing the field of that generator at a high rate of speed as compared with the normal period of the field of circuit of that generator, together with means for prolonging the energization of the field of the generator by a current of the one direction or the other, as required to compensate for the difference of potential referred to. Other features of my invention, considered as an apparatus, will be pointed out hereafter.

As a method my invention comprises compensating for differences of potential, as above referred to, and of preventing the impressing of a voltage oscillation by the correcting generator itself, which method comprises normally reversing the current in the field circuit of that generator at a higher rate than that of the oscillation which the generator itself tends to produce, and effecting correction for differences of potential such as referred to, by prolonging the energization of the field of that generator by currents of the one direction or the other, as may be required. Other features of my invention considered as a method will be pointed out hereafter.

The object of my invention is to provide simple and reliable methods and means for compensating for differences of potential between the grounds at the two ends of a system of communication, or signaling system, as it may be termed variously, and to avoid any periodic oscillation of potential due to the action of the compensating means itself.

I will now proceed to describe my invention with reference to the accompanying drawings which illustrate diagrammatically compensating arrangements embodying the apparatus portion of my invention, and adapted for carrying out the method portion of my invention, in connection with systems of communication, or signaling systems, extending between the points between which the differences of potential exist. In said drawings:

Figure 1 is a diagram showing two systems of communication between terminal bus-bars at two stations between which differences of potential may exist, together with means, such as above referred to, for compensating for such differences of potential; and Fig. 2 is a fragmentary diagram illustrating an alternative arrangement of vibrating relay which may be employed.

In the operation of telegraph systems, telephone systems and the like, much trouble is frequently experienced due to a difference of potential between the grounding points of the system, which difference of potential is commonly due to neighboring electric railways or electric power circuits or the like. This difference of potential, due to causes external of the system of communication, is frequently variable, which makes correction for such difference of potential by ordinary means yet more difficult. By the present invention such difficulty is overcome.

Referring first to Fig. 1: 1 and 2 designate grounding bus-bars at the two points between which the difference of earth potential exists; and 3 and 4 designate the line wires of systems of communication extending from the one bus-bar to the other. At the ends of these conductors 3 and 4 I have shown, diagrammatically, the transmitting and receiving arrangements of ordinary duplex telegraph systems, such transmitting and receiving arrangements being too well known to require description here. The systems of communication of wires 3 and 4 are entirely separate and distinct, and there may be as many of these systems between bus-bars 1 and 2, as desired; nor need these systems of communication be of the same nature; that is to say, one might be a telegraph system and the other or others telephone systems. 5 designates an earth connection for bus-bar 1, and 6 designates a generator interposed in that ground connection, 7 being the field windings of that generator. 8 designates the ground connection for bus-bar 2. It will be apparent that generator 6, if properly controlled and operated, will create a potential, equal and opposite to the earth potential existing between ground connections 5 and 8, so neutralizing, or compensating for, the actual difference in earth potential between points 5 and 8.

9 designates a polar relay having two magnet windings 10 and 11. For convenience in illustration, these two windings 10 and 11 are shown as on separate spools; but in practice, and as is well known, these windings will commonly be located on the same spools. Winding 10 is located in a conductor 12 leading from bus-bar 1 to some point 13, at which no potential disturbance exists. This point 13 is usually a point located laterally with respect to the conductors 3 and 4; that is to say it it not usually a point which is either in a direct line between points 1 and 2, or a point close to the line conductors 3 and 4. Winding 11 is in a circuit comprising a conductor 14 extending to the armature of a further relay 15 and thence, through one or the other of the opposed contact points of that relay, and through one or the other of the opposing batteries 16 and 17, to a conductor 18 containing a condenser 19 and thence back to the windings 11. The field windings 7 of generator 6 are connected by conductors 20 and 21 to the armature of relay 15, and to the opposed batteries 16 and 17.

Opposed batteries 22 and 23 are connected to opposed contact points of relay 9, and thence are connected by a conductor 24 which passes through the magnet windings of relay 15, to the armature of relay 9.

The action which results with the circuit arrangements thus described, is as follows:

Assume that there is no current in windings 10 of relay 9. If at a given instant the tongue of relay 9 touches its upper contact, there will be a current through battery 23 and conductor 24 tending, we will say, to move the tongue of relay 15 to the right. As soon as this tongue touches its right hand contact point a potential of one sign will be impressed on generator field winding 7, through battery 16 and conductor 21; at the same time a current impulse will flow from battery 16 through conductor 18 and windings 11 of relay 9 in such direction as to move the armature downward, we will say. As soon as the armature of relay 9 contacts with its lower stop, a circuit is established, through battery 22, conductor 24, and the windings of relay 15, whereby the position of the armature of relay 15 is reversed, and thereby there is impressed upon the field winding 7 of generator 6 a potential from battery 17, of a direction opposite that which was just previously impressed upon that field winding. This vibrational action of the armatures of the two relays continues indefinitely, except as conditions may change as stated presently. Since, due to the large self inductance of generator field winding 7, a comparatively long time (perhaps one second or more) is required to effect a considerable change in the current through it, it is evident that the rapid vibrations of the relays can cause only exceedingly small oscillations of the current in those field windings 7.

If there be a current in winding 10 of relay 9, due to difference of potential between the "corrected" bus-bar 1, and the true earth potential at 13, the armature or tongue of relay 9 will tend to rest against its one contact or the other (according to the direction of current in conductor 12) a greater length of time than it does against the other contact of that relay. As a result the tongue of relay 15 will also tend to rest against one contact a greater length of time than against the other thus enabling the current in generator field winding 7 to build up to a value sufficient to cause the generator to compensate for the difference in potential between bus-bar 1 and ground 13. A strong current in winding 10 of relay 9 (that is to say, a strong current in conductor 12) will entirely overpower the effect of the current in winding 11, and will cause the relay vibrations to stop until the generator voltage has changed to a degree sufficient to compensate for the difference in earth potentials causing the strong current in winding 10.

The condenser 19 has a beneficial effect in preventing a steady current from flowing through windings 11, which steady current if it existed might interfere somewhat with the efficiency of the system in correcting for steady differences of potential between grounds 5 and 13.

A condenser 27, shunted around the armature of generator 6, forms a short circuit for abrupt voltage pulses caused in the armature of the generator by induction from the generator field windings by reason of the direct mutual-inductance of armature and field.

Heretofore a system for equalizing the potentials of grounding points has been devised, wherein a generator is interposed between one terminal bus-bar and the ground for that bus-bar, such generator being intended to compensate for difference of potential existing between the two terminal bus-bars of the system, such for example as bus-bars 1 and 2; a special line conductor being employed to connect these two terminal bus-bars, and there being in such line conductor the field magnets of a polar relay, the armature contacts of which relay control two opposing batteries, which are connected in circuit (through the contact points of the relay) with the field coils of the said generator. In practical use of this former system referred to it has been found that the potential of the "corrected" bus-bar oscillates about the mean potential, instead of being steady. In one case the oscillation was found to be equivalent to an alternating current potential of about ten volts with a frequency of about fifteen cycles per second; the potential being between the corrected bus-bar and the true earth. The cause of this oscillation of potential is undoubtedly the inductance of the field circuit of the generator, giving to that generator a certain time factor, and the time factor of the relay, determined in part by its adjustment. By the present invention, this existence of a normal period of the field circuit producing a potential oscillation such as described, is avoided; the relay 9 being vibrated (except as its normal vibrations are checked by current through the circuit 12 and windings 10) at a relatively high rate, so that the batteries 16 and 17 affect the field windings 7 of the generator 6 not at all, practically, unless there be a distinct current flow in conductor 12 and windings 10 tending to cause the armature of relay 9 to linger against one stop or the other, and so causing the armature of relay 15 to correspondingly linger.

Resistances 25 and 26 are arranged in shunt relation with respect to the contact points of relay 15, and serve to reduce sparking at the contact points of that relay.

It is not necessary that two coöperating relays, such as relays 9 and 15, be employed for effecting the rapidly recurring reversal of the field circuit of the generator 6. In Fig. 2 I illustrate an arrangement wherein a single relay, $9^a$, is employed for this purpose. In this figure, as in Fig. 1, 1 designates a correcting bus-bar of the system, 6 the correcting generator, 7 the field of that generator, $9^a$ the vibrating relay referred to having magnet coils $10^a$ and $11^a$, 22 and 23 designate opposing batteries or other generators, and 12 designates a circuit leading from the bus-bar 1 to a point of neutral potential 13. In this arrangement the circuit of magnet coils $11^a$ extends from conductor $24^a$ through a condenser 28 and resistance 29 and the magnet coils $11^a$ to the armature of the relay; and resistance shunts 30 and 31 connect field coil 7 with batteries 22 and 23 respectively. It will be seen that when the armature of relay $9^a$ contacts with either of its two stops, a current impulse is transmitted from the one or the other of batteries 22 and 23, as the case may be, through that contact stop with which the armature has just made contact, and through the magnet coils $11^a$ and resistance 29 and condenser 28, back to the said battery, and thereby the magnet $11^a$ is energized to reverse the position of the armature. The charging and discharging of condenser 28 insures the complete travel of the armature from the one stop to the other, and prevents the armature from vibrating back and forth close to one of its contact stops, without traveling over to contact with its other contact stop. The action of the relay may be regulated in large measure by regulation of the condenser 28 and resistance 29.

In the specific embodiment of my apparatus illustrated and described in Fig. 1, the relay 9, when in vibration, reverses the current in the magnet circuit of relay 15, and the relay 15, in turn, reverses the circuit of magnet 11 of relay 9. In a companion application Serial No. 153,823 I have shown an alternative arrangement wherein a relay corresponding to relay 9, when in vibration reverses the current in the magnet circuit of a relay corresponding generally to relay 15; the vibration of the relay corresponding to relay 9 being maintained by local circuit means. In a further companion application, Serial No. 153,824, a relay corresponding to relay 9 reverses the current in the magnet circuit of a relay corresponding to relay 15, the vibrations of the relay corresponding to relay 9 being maintained by a coil in the magnet circuit of that relay, and itself in inductive relation to the field coil of the generator corresponding to generator 6. The generic claims to these three arrangements are contained in the present case.

The method of and means for preventing the "hunting" action of the correcting generator, i. e., the impressing of a voltage oscillation, by the correcting generator itself, above described, are not confined to prevention of, or correction or compensation for, direct current ground potential disturbance, but are applicable also to the prevention of such hunting action in the case of correction for alternating current electromagnetic induction or alternating current ground potential, and are shown and described as so applied in my companion application, Serial No. 153,825.

What I claim is:—

1. The herein described method of equalizing the potential between a grounding point of a system of electrical communication and true earth potential, which consists in connecting such grounding point to ground and normally maintaining in such ground connection an alternating potential of high frequency and minimal value, and during times of difference of potential between such grounding point and true earth potential prolonging the waves of one direction or the other, according to circumstances, of such alternating potential and causing them to increase in voltage to compensate for the potential disturbance at the grounding point.

2. The herein described method of compensating for potential disturbance at an earthing point of a system of electrical communication, which consists in including between the said system of communication and its earthing point a generator having a field by variation of current flow through which the direction and voltage of the current of the generator may be varied, passing a current through such field and reversing such current at a high rate during times of little or no potential disturbance, and thereby preventing the generator current from building up to a material value, and during times of material disturbance prolonging said field current waves of the one direction or the other, according to circumstances, and thereby causing the current of said generator to build up to compensate for such potential disturbance.

3. A ground connection for systems of communication comprising a connection from one point of such system to a grounding point at which disturbance of earth potential may exist, a generator in such connection having a controlling field coil, means for passing current through such field coil and for constantly reversing such current at a high rate as compared with the period of oscillation of potential which that generator would otherwise tend to produce, and a connection from such system of communication to another grounding point, comprising means for prolonging waves of the one direction or the other, according to circumstances, of the current so passed through said generator field coil.

4. A ground connection for systems of communication comprising a connection from one point of such system to a grounding point at which disturbance of earth potential may exist, a generator in such connection having a controlling field coil, means for passing current through such field coil and for constantly reversing such current at a high rate as compared with the period of oscillation of potential which that generator would otherwise tend to produce, and a connection from such system of communication to a point relatively free from earth potential disturbance, comprising means for prolonging waves of the one direction or the other, according to circumstances, of the current so passed through said generator field coil.

5. A ground connection for systems of communication comprising a connection from one point of such system to a grounding point at which disturbance of earth potential may exist, a generator in such connection having a controlling field coil, means for passing current through said field coil and for constantly reversing such current, comprising self-vibratory relay means, and means for causing such relay means, in the event of disturbance of earth potential, to prolong current waves through such field coil of the one direction or the other, according to circumstances.

6. A ground connection for a system of communication comprising a connection from one point of such system to a grounding point at which disturbances of earth potential may exist, a generator in such ground connection having a controlling field circuit, a source of current supply therefor, two relays, and connections therebetween causing each relay to cause the other to vibrate normally, one of said relays arranged by its vibration to reverse the current in said field circuit, the other relay having a magnet coil in addition to that magnet coil by which it is caused to vibrate, and another ground connection for such system or communication passing through such second magnet coil of said second relay.

7. A ground connection for a system of communication comprising a connection from one point of such system to a grounding point at which disturbances of earth potential may exist, a generator in such ground connection having a controlling field circuit, a source of current supply therefor, two relays, and connections therebetween causing each relay to cause the other to vibrate normally, one of said relays arranged by its vibration to reverse the current in said field circuit, the other relay having a magnet coil in addition to that magnet coil by which it is caused to vibrate, and another ground connection for such system of communication passing through such second magnet coil of said second relay to a point free from earth potential disturbance.

8. A ground connection for a system of communication comprising a connection from one point of such system to a grounding point at which disturbance of earth potential may exist, a generator in such ground connection having a controlling field circuit, a source of current supply therefor, two relays having magnet coils, and sources of current supply therefor, and having armatures and contact points and connections whereby each relay, when operated, reverses the current in the magnet circuit of the other relay, one of said relays arranged likewise to reverse the current in the field circuit, a condenser in the magnet circuit of the other relay preventing a steady current from flowing therethrough, said second relay having a further magnet circuit, and another ground connection from said system of communication passing through said further magnet circuit.

9. The hereindescribed method of preventing, in a signaling system compensated for disturbance by a connecting generator, the impressing of a voltage oscillation by the correcting generator itself, which comprises normally reversing the current in the field circuit of said generator at a rate higher than that of the oscillation which the generator tends to produce, and during periods of disturbance prolonging the current waves of the one direction or the other, in said field circuit, according to circumstances, thereby permitting the compensating voltage of the generator to build up accordingly.

10. In a system of communication comprising a correcting generator, the combination with such correcting generator, of means for normally reversing the current in the field coil of that generator at a rate higher than that of the oscillation which that generator tends to produce, and means for prolonging energization of said field coil in the one sense or the other, as may be required for correction.

11. In a system of communication comprising a correcting generator, the combination with such correcting generator, of means for normally reversing the current in the field coil of that generator at a rate higher than that of the oscillation which that generator tends to produce, and automatic means for prolonging energization of said field coil in the one sense or the other, as may be required for correction.

12. In a system of communication comprising a correcting generator, the combination with such correcting generator, of means for normally reversing the current in the field coil of that generator at a rate higher than that of the oscillation which that generator tends to produce, such means comprising self-vibratory relay means, and means for causing such relay means to prolong energization of said field coil in the one sense or the other, as may be required for correction.

13. In a system of communication comprising a correcting generator, the combination with such correcting generator, of two relays, and connections therebetween causing each relay to cause the other to vibrate normally, one of said relays arranged by its vibration to reverse the current in the field circuit of said generator, the other of said relays comprising means whereby it may be caused to linger against its one contact or the other as may be required for correction.

14. In a system of communication comprising a correcting generator arranged to correct for external disturbances imparted to the system, the combination with such correcting generator, and a control circuit subjected, like such system of communication, to the disturbance, of means for normally reversing the current in the field coil of that generator at a rate higher than that of the oscillation which that generator tends to produce, and means controlled by said control circuit for prolonging energization of said field coil in the one sense or the other, as may be required for correction.

15. In a system of communication comprising a correcting generator arranged to correct for external disturbances imparted to the system, the combination with such correcting generator, and a control circuit subjected, like such system of communication, to the disturbance, of means for normally reversing the current in the field coil of that generator at a rate higher than that of the oscillation which that generator tends to produce, and automatic means controlled by said control circuit for prolonging energization of said field coil in the one sense or the other, as may be required for correction.

16. In a system of communication comprising a correcting generator arranged to correct for external disturbances imparted to the system, the combination with such correcting generator, and a control circuit subjected, like such system of communication, to the disturbance, of means for normally reversing the current in the field coil of that generator at a rate higher than that of the oscillation which that generator tends to produce, such means comprising self-vibratory relay means, and means controlled by said control circuit for causing such relay means to prolong energization of said field coil in the one sense or the other, as may be required for correction.

In testimony whereof I have signed this specification in the presence of two subscribing witnesses.

JOSEPH W. MILNOR.

Witnesses:
H. M. MARBLE,
PAUL H. FRANKE.